No. 618,939. Patented Feb. 7, 1899.
R. W. HEARNDEN.
COMBINED CYCLE MUD AND DRESS GUARD.
(Application filed July 28, 1898.)
(No Model.)
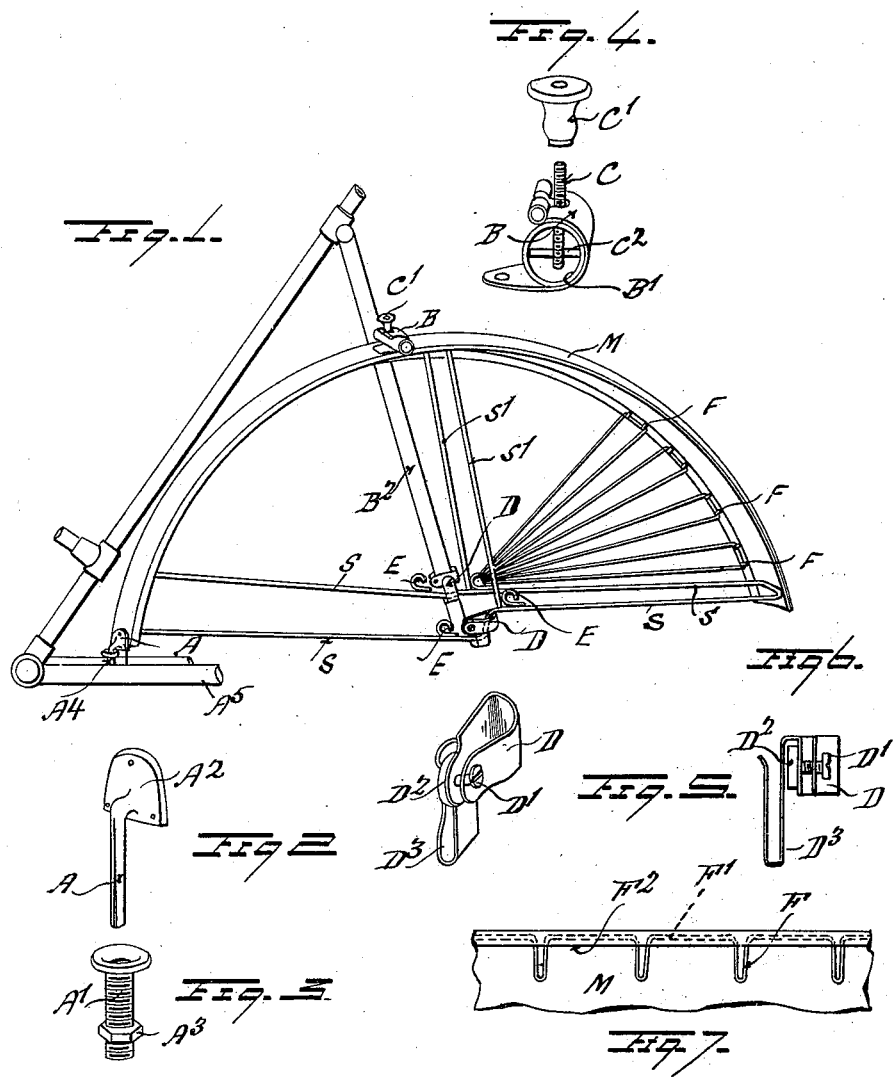

UNITED STATES PATENT OFFICE.

ROBERT WILLIAM HEARNDEN, OF MAIDSTONE, ENGLAND.

COMBINED CYCLE MUD AND DRESS GUARD.

SPECIFICATION forming part of Letters Patent No. 618,939, dated February 7, 1899.

Application filed July 28, 1898. Serial No. 687,146. (No model.)

*To all whom it may concern:*

Be it known that I, ROBERT WILLIAM HEARNDEN, a subject of the Queen of Great Britain, residing at Maidstone, in the county of Kent, England, have invented a certain new or Improved Combined Cycle Mud and Dress Guard, of which the following is a specification.

My invention has reference to mud-guards and dress-guards for cycles, and has for its object a quick and easy means of fixing them to and detaching them from the bicycle without the aid of tools.

In order that my invention may be the better understood, I append the accompanying sheet of drawings, in which—

Figure 1 is a perspective view, partly broken away, showing a mud-guard attached to a bicycle-frame. Figs. 2 to 6 are perspective views of details used in connection with the fastening of the mud-guard on the bicycle. Fig. 7 shows a preferred method of construction of the mud-guard to receive dress-guard laces.

M represents an ordinary mud-guard, which may be of steel, wood, celluloid, or any rigid material, with horizontal stays $s$ $s$ and vertical stays $s'$ $s'$, which are bent or curved to suit any peculiarity of the frame of the machine.

By the use of horizontal stays $s$ $s$, extending from one end of the mud-guard to the other, and with the further assistance also of the vertical stays $s'$ $s'$, the mud-guard is strongly braced independently of its connection with the cycle, and consequently can be laced or otherwise made to hold the dress-guard, which will be held taut by the guard both when the latter is on and off the cycle.

A, Fig. 2, represents a metal pin having its basal end broadened out to form a plate $A^2$, riveted or otherwise fixed to the mud-guard M. The pin A is split longitudinally and sprung to fit comfortably the socket $A'$, Fig. 3. The socket $A'$ is fitted in a hole drilled in the bridge $A^4$ between the lower back tubes $A^5$ of the cycle, as shown sufficiently in Fig. 1, and is secured by the nut $A^3$.

B, Fig. 4, is a metal clip fixed to the mud-guard M and slotted to pass the screw-threaded pin projecting from the bridge $B'$ between the upper backstays $B^2$ of the cycle, as shown in Fig. 4.

$C'$ is a thumb-screw which binds the clip B to the bridge $B'$ when in position, as shown in Fig. 1. To secure the pin C, it may be passed through a hole drilled in the bridge $B'$, and a pin $C^2$ may be passed through the bridge $B'$ and through a hole in the pin C. For attaching the mud-guard to the two upper backstays I employ two clips, as shown in Figs. 5 and 6, to take the stays $s$ $s$ of the guard M to prevent clattering or noise between the guard-stays and the backstays. These clips consist of a strap D, preferably of metal, of a shape to embrace the upper backstays and tightened by a screw $D'$ and nut $D^2$. On the inside the clip is made with a spring-hook $D^3$ to receive the stays $s$ $s$ of the mud-guard.

For lacing the guard I may employ open-coiled ring-hooks E, Fig. 1, two fitted on each side and near to the vertical stay on the horizontal stays, and hooks or wires F, fixed to the under edges of the mud-guard, as shown in Fig. 1 or more particularly in Fig. 7. The lacing is carried alternately from hooks E to hooks F. By this means the lacing can be more easily fitted, removed, and replaced than when eyelets are employed.

The hooks F may be provided by bending a wire $F'$ so as to form along its length a series of lateral projections and then wrapping the wire within the inturned edge of the guard M, so that the projections remain uncovered and lie toward the middle line of the guard, thus forming the hooks F, previously referred to.

It will be obvious that for cycles for men's use the dress-guard will not be required, and in such case the hooks E and F are omitted. In this instance also since the mud-guard has not to keep the dress-guard taut it need not be so effectually stayed; but the forward part of the horizontal stays and the vertical stays could be omitted.

When it is desired for the purpose of cleaning or performing any repairs to the machine or otherwise to remove the mud-guard, the thumb-nut $C'$ is released and the guard drawn around and away from the wheel. To refix, the operation is reversed, the guard is carried forward until the pin A enters the socket A', and the clip B clasps the bridge. The stays at the same time fall into the hooks D³ of the clips D. The nut C' is then screwed down and fixes the whole firmly to the cycle.

I am aware that various devices have been introduced in connection with mud-guards and dress-guards and means of attaching same to bicycles, and I make no claim generally to detachable guards; but

I claim as my invention—

1. The combination with a mud-guard M of stays *s s* connecting the ends of said mud-guard, stays *s' s'* connected at one end to said stays *s s* about midway thereof and at the other end to said mud-guard about midway thereof such stays *s s s' s'* bracing said mud-guard independently of its attachment to a cycle-frame, and dress-guards attached to said mud-guard and stays and held distended thereby independently of the cycle-frame.

2. The combination with a cycle-frame of a socket A' fitted thereto, a mud-guard M, a split pin A on the latter adapted to enter the socket A' and frictionally engage the same and means for attaching the mud-guard to the upper back fork of the cycle-frame.

3. The combination with a cycle-frame of a socket A' fitted thereto, a mud-guard M, stays *s s* connecting the ends of said mud-guard, a pin on said mud-guard adapted to frictionally engage the socket A' and clips attachable to the limbs of the back fork of the cycle-frame adapted to frictionally engage the stays *s s*.

4. The combination with a cycle-frame having a bridge-piece B' of a screw-threaded pin C in said bridge-piece, a socket A' fitted to said frame, a mud-guard M, a pin on said mud-guard adapted to frictionally engage said socket A', a curved plate B on said mud-guard adapted to partially surround the bridge-piece B' from behind and having a slit for passage of the pin C and nut C' on said pin C substantially as and for the purpose set forth.

5. The combination of a mud-guard having inturned edges of a wire F' wrapped within said edges, said wire being bent to form lateral projections F at intervals along its length, said projections lying beyond the edges in a direction inward within the mud-guard to form dress-guard-holding hooks substantially as described.

In witness whereof I have signed this specification in the presence of two witnesses.

ROBERT WILLIAM HEARNDEN.

Witnesses:
A. E. MELHUISH,
D. HASLETT.